Feb. 7, 1961   E. F. KOHL   2,970,373
PROCESS OF PREPARING PANELS
Filed June 22, 1959   6 Sheets-Sheet 1

INVENTOR.
EVERARD F. KOHL
BY John Mahoney
ATTORNEY

Feb. 7, 1961 E. F. KOHL 2,970,373
PROCESS OF PREPARING PANELS
Filed June 22, 1959 6 Sheets-Sheet 2
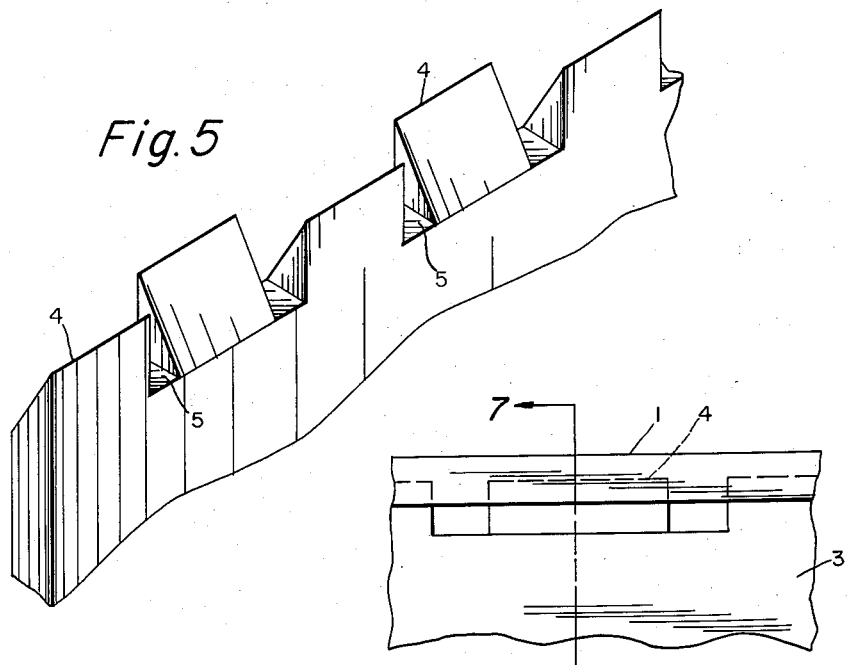
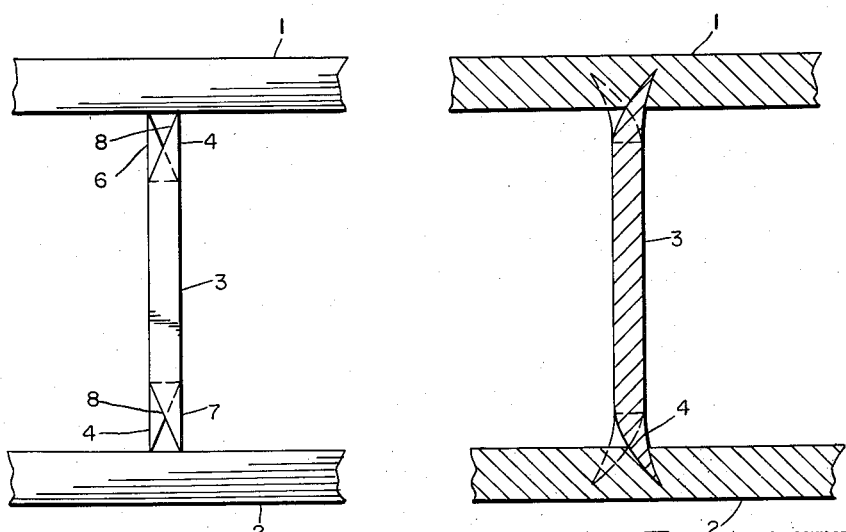
INVENTOR.
EVERARD F. KOHL
BY
John Mahoney
ATTORNEY INVENTOR.
EVERARD F. KOHL
BY John Mahoney
ATTORNEY Feb. 7, 1961 E. F. KOHL 2,970,373
PROCESS OF PREPARING PANELS
Filed June 22, 1959 6 Sheets-Sheet 5

INVENTOR.
EVERARD F. KOHL
BY
John Mahoney
ATTORNEY

Feb. 7, 1961 E. F. KOHL 2,970,373
PROCESS OF PREPARING PANELS
Filed June 22, 1959 6 Sheets-Sheet 6

INVENTOR.
EVERARD F. KOHL
BY
John Mahoney
ATTORNEY

United States Patent Office 2,970,373
Patented Feb. 7, 1961

2,970,373
PROCESS OF PREPARING PANELS
Everard F. Kohl, Lakewood, Ohio
(12210 Triskett Road NW., Cleveland 11, Ohio)
Filed June 22, 1959, Ser. No. 822,007
8 Claims. (Cl. 29—423)

The present invention relates to panels of the sandwich type for use in building constructions, such as walls, floors, ceilings, partitions, or doors, or for use in accessories or appliances, such as sinks, bars, or table tops. It also relates to an improved process of preparing such panels.

In my copending application, Ser. No. 731,489, filed in the United States Patent Office on April 20, 1958, a panel of the sandwich type is disclosed in which core material in the form of metal tubes or strips is mechanically connected to outer sheets by pressure applied to the outer faces of the sheets. Such a method of preparing panels is more economical than prior processes because it eliminates the costly steps of welding or brazing the outer sheets to the core metal. It also enables a decorative material to be applied to the outer face of one or both sheets prior to assembly.

It is an object of the present invention to provide an improved panel in which metal core strips are mechanically connected to the outer sheets to provide a sandwich construction that is light in weight and which has high strength and low thermal conductivity.

Another object of the invention is to provide an improved panel in which thin metal core strips, each having a plurality of angularly-shaped portions, are mechanically connected to outer sheets or skins in a manner to provide a sandwich construction that is light in weight and which has high strength and low thermal conductivity.

A further object of the invention is to provide an improved panel in which tapered projections on the marginal edge portions of core strips extend into and are angularly embedded in outer metal sheets by a rolling or pressing operation applied to the outer faces of the sheets and in which the core strips are so thin in cross section that they would collapse under the pressure required to force the projections in their marginal edge portions into the outer sheets in the absence of supporting means therefor during the pressing or rolling operation.

A still further object of my invention is to provide an improved process of preparing panels of the sandwich type by means of which comparatively thin core strips may be mechanically connected to the outer sheets or skins by a rolling or pressing operation and in which removable means are provided to support the core strips during assembly.

My invention will be better understood by reference to the accompanying drawings in which:

Fig. 4 is an enlarged detail view of a portion of the panel and a portion of one of the core strips prior to the pressing operation;

Fig. 5 is an enlarged perspective view with parts broken away showing one of the side margins of a portion of a core strip;

Fig. 6 is a fragmentary side elevational view of a portion of one of the core strips, showing portions of the tapered projections on the upper margin of a core strip embedded in the upper core sheet;

Fig. 7 is a detail cross sectional view taken on a plane passing through the line 7—7 of Fig. 6, looking in the direction of the arrows and showing a portion of a core strip and the outer sheets with alternately disposed projections in the upper and lower margins of the core strip extending into and being angularly embedded in opposite directions within the outer sheets;

Figure 1:
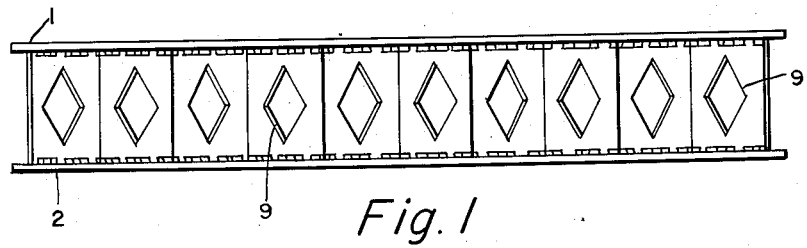
Fig. 1 is a side elevational view of my improved panel prior to the pressing operation.
Figure 2:
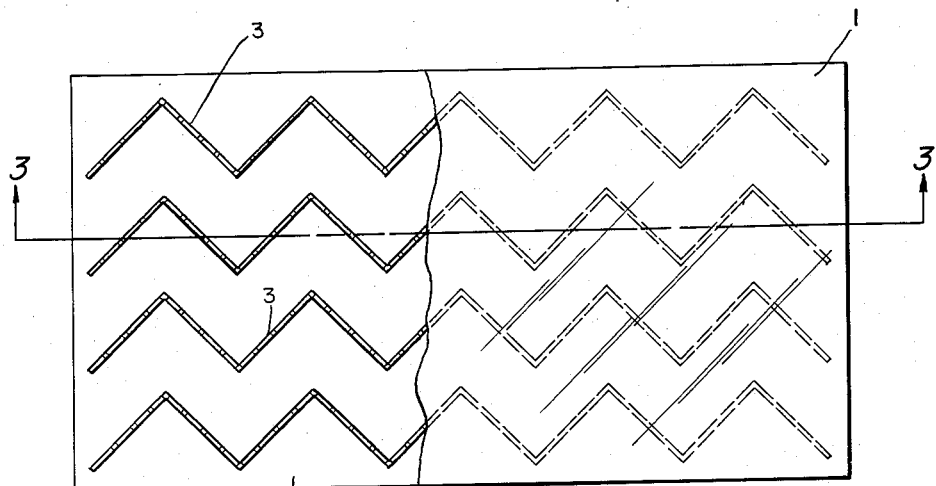
Fig. 2 is a plan view with parts of the upper sheet broken away to show the upper edge portion of the metal core strips prior to the pressing operation.
Figure 3:
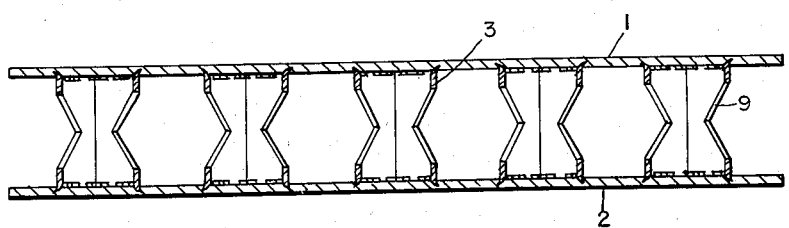
Fig. 3 is a cross sectional view taken on a plane passing through the line 3—3 of Fig. 2, looking in the direction of the arrows after the core strips have been mechanically connected to the outer sheets.

As shown in Figs. 1 to 7 and 8 of the drawings, the panel consists of outer skins or sheets 1 and 2 which may be formed of any suitable sheet metal stock, such as rolled aluminum or steel, and between which are interposed metal core strips 3 that are mechanically connected to the outer sheets or skins in a manner to minimize thermal conduction between the sheets or skins. To provide a strong support for the outer sheets or skins, each of the core strips is zigzag in shape and consists of a corparatively large number of angularly-shaped portions and while the angles between the adjacent portions may vary and may be obtuse or acute, they are preferably arranged at an angle of approximately 90° relative to each other. In general, it may be stated that the angle between the diverging wall portions of each core strip should be such that each of the core strips provides a comparatively large number of braces for the outer sheets. The angle between each pair of diverging side wall portions should be large enough, however, to enable supporting means for the core strips to be arranged adjacent the diverging side walls of the core strips. As shown in Figs. 2 and 9, the adjacent portions of the core strips extend at substantially 90° to each other, and to enable a comparatively large number of core strips to be disposed in close relation to each other, the apices of the angularly-shaped portions of each core strip are arranged in alignment with the corresponding apices of the angularly-shaped portions of each of the other core strips. The perpendicular distance between parallel lines drawn tangent to the focal portions, such as the apices, on the opposing sides of proximate core strips, however, should be sufficient to permit the withdrawal of supporting means arranged between proximate core strips but to enable each core strip to form a comparatively large number of angularly-shaped braces for the sheets, the perpendicular distance between parallel lines drawn tangent to the focal portions of proximate pairs of core strips, should be less than the perpendicular distance between parallel lines drawn tangent to the focal portions, such as the apices, on opposite sides of each core strip.

The core strips are mechanically connected to the outer sheets or skins by a pressing or rolling operation and to provide a strong mechanical connection between the core strips and the outer sheets or skins, the upper and lower marginal edge portions of the core strips are provided with tapered projections 4 which are spaced from each other by narrow slots 5 which as shown are substantially shorter than the projections.

To provide tapered edge portions that may be forced into and angularly embedded within the metal of the outer sheets or skins during the pressing or rolling operation, the core strips are formed of metal that is thinner in cross section than the outer sheets or skins and one of the faces 6 of each projection on the upper edge portion of each core strip extends normal to the upper sheet as indicated by the numeral 6 and one of the faces 7 of each projection in the lower edge margin of each core strip extends normal to the face of the lower sheet and the other face 8 of each projection is tapered toward its normally extending face to provide an outer penetrating edge portion which is of the same width as the remainder of the projection, and to minimize the strain on the body portion of the core metal during the pressing or rolling operation, some of the projections in each edge margin of each core strip have faces which are tapered in one direction and others have faces which are tapered in the opposite direction. As shown in the drawings, each of the alternate projections in each marginal edge portion of each core strip has a face which is tapered in one direction toward its normally extending face and each of the other alternate projections in each marginal edge portion of each core strip has a face which is tapered in the opposite direction to its normally extending face, and to minimize thermal conduction between the sheets or skins and the core strips, each of the tapered projections on each side margin are preferably of such height, such as approximately $\frac{1}{16}$ of an inch, that only part of the tapered portion of each projection in the upper margin of each core strip is forced into and angularly embedded in the upper sheet and only part of each projection in the lower edge margin of each metal core strip is forced into and angularly embedded within the lower sheet or skin during the pressing or rolling operation.

As previously stated, the core strips may be formed of the same metal as the outer skins or sheets or they may be formed of a metal that is harder than the metal of the outer skins or sheets. When the core strips are formed of the same metal as the outer skins or sheets, the tapered edge projections may be hardened by working in any desirable manner. For instance, to increase their hardness, the tapered projections may be formed by a pressing operation. When a panel is desired which is light in weight, the outer skins or sheets are preferably formed of aluminum. Aluminum, however, has high thermal conductivity and consequently when the outer skins or sheets are formed of aluminum, the core strips are preferably formed of a metal that has a lower thermal conductivity than aluminum, such as iron or steel.

To increase the strength of the core strips per unit weight and to decrease their thermal conductivity, the strips are preferably provided with openings. For instance, when each strip is formed of a comparatively large number of angularly-shaped portions, one or more openings may be formed in the sides of each angularly-shaped portion and while the openings may be of any desired shape, such as rectangular, triangular, or circular, as shown more particularly in Fig. 1, the opening 9 in each side of each angularly-shaped portion is in the form of a parallelogram having upper and lower acute angles and obtuse side angles which are spaced only a short distance from the edges of the face of each angularly-shaped portion to restrict the area of the metal on opposite sides of the openings.

In building constructions, the panel will not usually be subjected to as high a pressure in service as that required to force the projections of the core metal into the respective sheets and consequently even when the core strips are comparatively thin in cross sections, panels of sufficient strength will be provided for use in service when the core strips are arranged in comparatively close relation to each other and each is provided with a comparatively large number of angularly-shaped portions which serve as braces for the outer sheets.

The thickness of the core strips will of course depend upon their height which in turn will depend upon the thickness of the panel desired. It will also depend upon the metal of which the core strips are composed. To further decrease the thermal conductivity of the panel in accordance with the present invention, each of the core strips is therefore preferably formed of a metal that is so thin in cross section that the core strips would collapse when pressure is applied to the outer sheets to force the projections in the upper and lower margins of the core strips into the respective sheets and angularly embed them therein unless means is provided to support the core strips during assembly. For instance, as a specific example, which is in no manner to be considered a limitation on the present invention, when the outer sheets are formed of aluminum having a thickness of approximately $\frac{1}{16}$ of an inch and each of the core strips is formed of steel having a height of approximately six inches and a thickness of approximately $\frac{1}{32}$ of an inch and has projections on each of its side margins which are alternately tapered in opposite directions, a pressure of approximately 5000 pounds per linear inch applied to the outer faces of the sheets is required to force portions of the tapered projections in the upper and lower side margins of each of the core strips into the metal of the sheets and to move the sheets toward each other a sufficient distance to cause the sheets to angularly embed the projections within the respective sheets. Under such conditions, it is necessary to support the core strips during the pressing or rolling operation to prevent them from collapsing under the pressure applied to the outer faces of the sheets.

I also provide a process of preparing panels having core strips which are of less thickness than the outer sheets and which may be and preferably are sufficiently thin in cross section so that unless supported they would collapse under the pressure applied to the outer faces of the sheets to force the projections in the upper and lower margins of each of the core strips into and to angularly embed them within the metal of the respective sheets. In accordance with the present invention, means are therefore provided to support the core strips in place during the pressing or rolling operation which means is easily removable after the panel is assembled, and while the core strips may be of any desired shape, such as straight or sinuous, to enable them to be maintained in close relation to each other and to provide a strong bracing support for the outer sheets, each of the core strips is shaped to provide a plurality of aligned focal portions on each side of the core strip which are parallel to each other and side wall portions which diverge from each focal portion and the core strips are arranged in such spaced relation to each other that the perpendicular distance between lines drawn tangent to focal portions on opposing sides of each pair of proximate core strips is sufficient to permit the withdrawal of supporting means arranged between the core strips but is less than the perpendicular distance between parallel lines drawn tangent to focal portions on the opposite sides of each core strip. As shown, the core strips are zigzag in shape and each core strip consists of a plurality of angularly-shaped portions having spaced apices and side portions extending therefrom and in which the apices of each core strip are arranged in alignment with the corresponding apices of the other core strips as shown in Figs. 2, 8 and 9 of the drawings.

The supporting means for the core strips will of course depend upon the shape of the core strip and has sufficient strength to prevent collapse of any portion of the core strips during the pressing operation. As shown in Figs. 8 and 9, the supporting means is of less height than the core strips and consists of two supports A and B arranged on the opposite sides of each core strip. Each of the supports is preferably formed of a metal having comparatively high strength, such as steel, and consists of vertically extending metal strips, the sides of which are pivotally connected together in such a manner that the supports may be easily removed from the panel after the pressing or rolling operation. As shown, the opposite sides of each strip of each support is provided with spaced knuckles which interfit with knuckles on an adjacent strip and is pivotally connected thereto by a vertically extending pivot pin and while the strips of each support may all be of the same width, to enable the core strips to be arranged in close proximity to each other, each of the strips of each support preferably consists of short horizontally extending strips, each of which engages the focal portions or the apex of an angularly-shaped portion of a core strip and the opposite sides of which are pivotally connected to pairs of pivotally connected strips of sufficient length to engage the sides of adjacent angularly-shaped portions.

Figure 8:
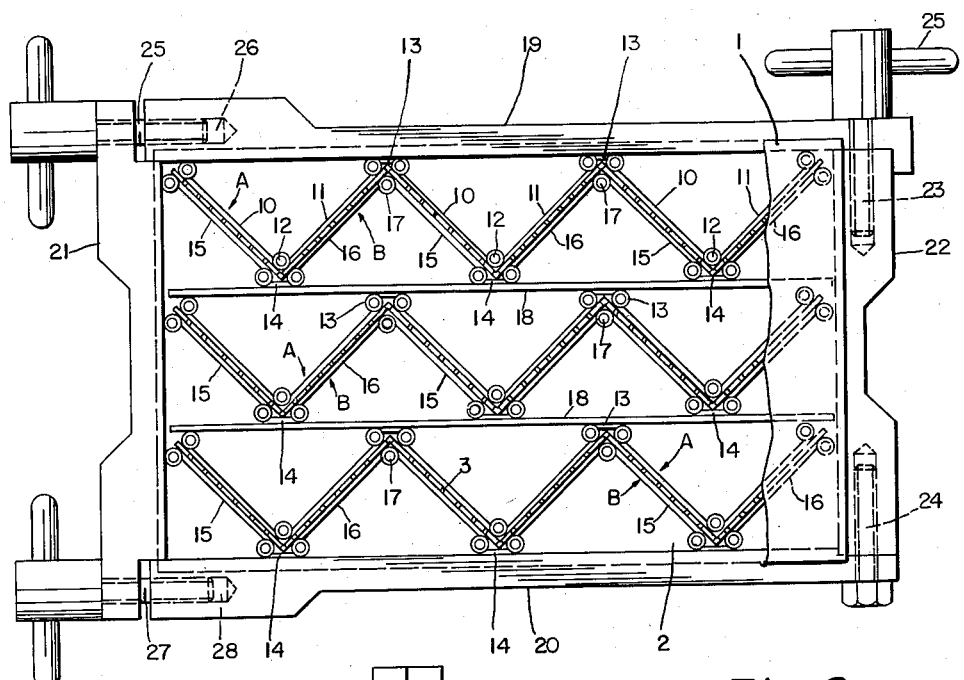
Fig. 8 is a plan view of an assembly including metal core strips interposed between upper and lower sheets, with only a fragmentary portion of the upper sheet being shown, and a frame for supporting the core strips between upper and lower sheets during the pressing or rolling operation.
Figure 9:
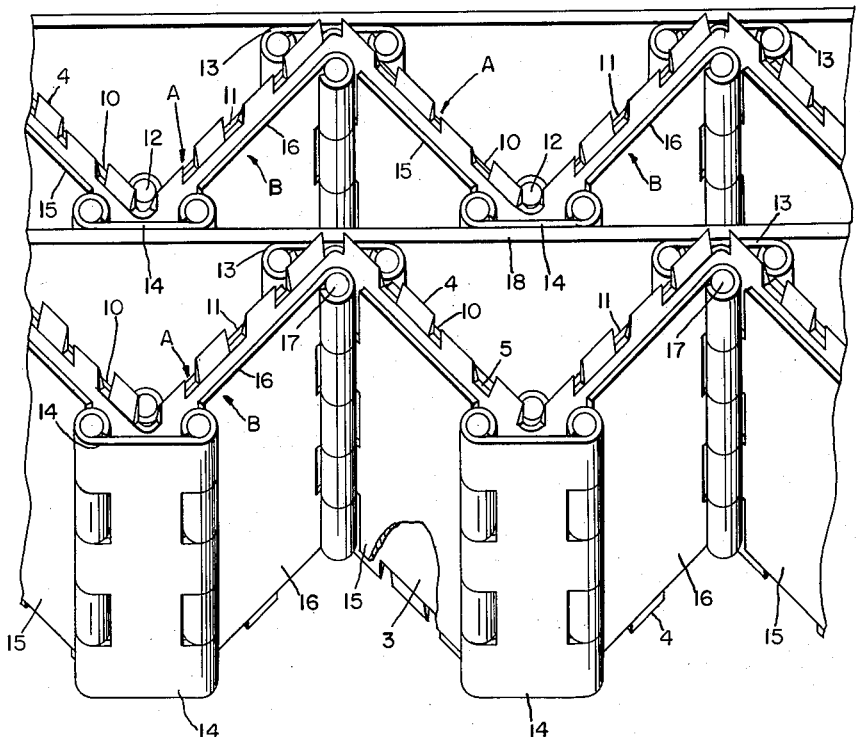
Fig. 9 is an enlarged perspective view of a portion of the core strips and the supporting means therefor and showing the relative heights of the supporting means and the core strips after a pressing or rolling operation.
Figure 10:
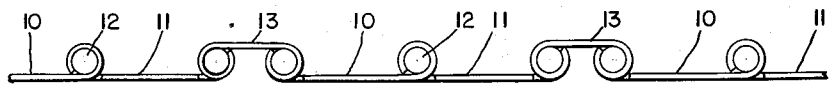
Fig. 10 is an edge view of the one of the supporting strips.
Figure 11:
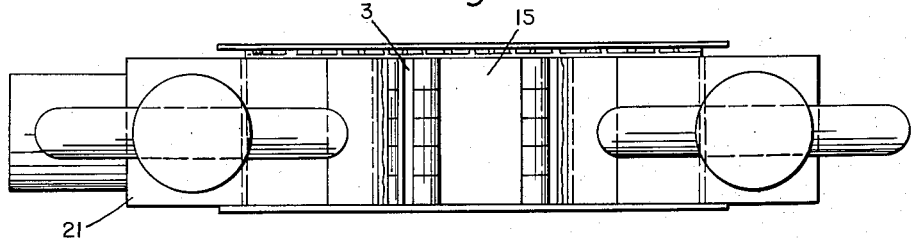
Fig. 11 is an end elevational view of the assembly shown in Fig. 8 with parts of one end wall of the supporting frame being shown broken away.

As shown in Figs. 8 and 10, the sides of one pair of strips 10 and 11 of the support A which are of the same width engage the inner faces of a V-shaped portion of a core strip and are pivotally connected together by a pivot pin 12 which is arranged in close proximity to the crotch of one of the V-shaped portions and one side of strip 11 is pivotally connected to one side of a horizontally extending short strip 13 and the other side of the short strip 13 is pivotally connected to one side of a strip 10 of another pair of strips 10 and 11, the sides of which engage the side walls of the next adjacent V-shaped portion and are pivotally connected together by a pin 12 arranged in proximity to the crotch of the V-shaped portion and this arrangement of the vertically extending strips of the support is continued throughout the length of each core strip.

The support B for the opposite side of each core strip is arranged in substantially the same manner. As shown, it consists of a plurality of short vertically extending strips 14, each of which extends horizontally and engages the apex of an angularly-shaped portion of the core strip and one of the short horizontally extending strips 14 of support B in proximity to one end of the core strip is pivotally connected to one side of a vertically extending strip 15 which engages one side of the angularly-shaped portion of the core strip which extends from one of its ends and the short horizontally extending strip 14 of the support in proximity to the other end of the core strip is pivotally connected to the side of a vertically extending strip 16 which engages one side of the angularly-shaped portion of the core strip which extends to the other end of the core strip, and intermediate the ends of the core strip, one side of each horizontally extending strip 14 of the support B is pivotally connected to a strip 16 of a pair of equal-width vertically extending strips 16 and 15 which extend along the sides of an angularly-shaped portion of the core strips and are pivotally connected together by a pivot pin 17 at approximately the crotch of the angularly-shaped portion. Strip 15 of each pair of strips 16 and 15 in turn is pivotally connected to one side of a second longitudinally extending short strip 14 and the opposite side of the second longitudinally extending short strip 14 is pivotally connected to one side of another pair of vertically extending strips 16 and 15 which engage the sides of another angularly-shaped portion and are pivotally connected together by a pin 17, and in the event that the core strips are longer than those shown in the drawings, this arrangement is continued throughout the length of the core strips.

To provide a further support for the core strips and to enable the pivotally connected supports A and B to be easily removed after the core sheets have been mechanically connected to the outer sheets, strips 18 which may be formed of a metal, such as steel, and which if desired may be slightly flexible, are disposed in the space between the longitudinally extending short portions of each pair of supports B and A and to hold the supports in place during the pressing or rolling operation, a frame is provided consisting of side walls 19 and 20 and end walls 21 and 22. The inner edge portion of side wall 19 extends between sheets 1 and 2 and engages the longitudinally extending strips 13 and the knuckles of the outermost supports A and the inner edge of side wall 20 extends between sheets 1 and 2 and engages the longitudinally extending strips 14 of the outermost support B. The inner edge portions of the end walls 21 and 22 likewise extend between sheets 1 and 2 and engage knuckles at the end portions of supports B.

The side and end walls of the frame may be connected together in any desired manner, such as by screws 23 and 24 which extend through the respective side walls and are threaded into enlarged portions of end wall 22. The end wall 21 may be connected to the side walls in a somewhat similar manner. As shown, a screw 25 extends through the end wall 21 and is threaded into an internally threaded opening 26 in an enlarged portion of the side wall 19 and a screw 27 is threaded into an internally threaded opening 28 in an enlarged portion of side wall 20.

It will of course be understood that the supports and the frame are of less height than the core strips. The supports, for instance, may be of substantially the same height as the body portion of the core strips between the upper and lower projections as shown in Fig. 9 and the frame may be of the same or substantially the same height as the supports so that when portions of the upper and lower projections on the margins of the core strips are forced into the upper and lower sheets and are angularly embedded therein, the frame and the supporting strips may be easily removed.

When the sheets, core strips, supports and frame are assembled in place in the manner described, the lower edges of the supports and the frame rest upon the bottom sheet and are moved upwardly when pressure is applied to the opposite faces of the sheets to force a portion of the upper and lower projections on each core strip into the outer sheets and to move the sheets toward each other to angularly embed the tapered projections within the sheets in alternate directions in the manner shown in Fig. 6 at which time the numerous angularly-shaped portions of the core strips provide a strong bracing support for the outer sheets or skins and this is true even though the core strips are comparatively thin in cross section.

Figure 12:
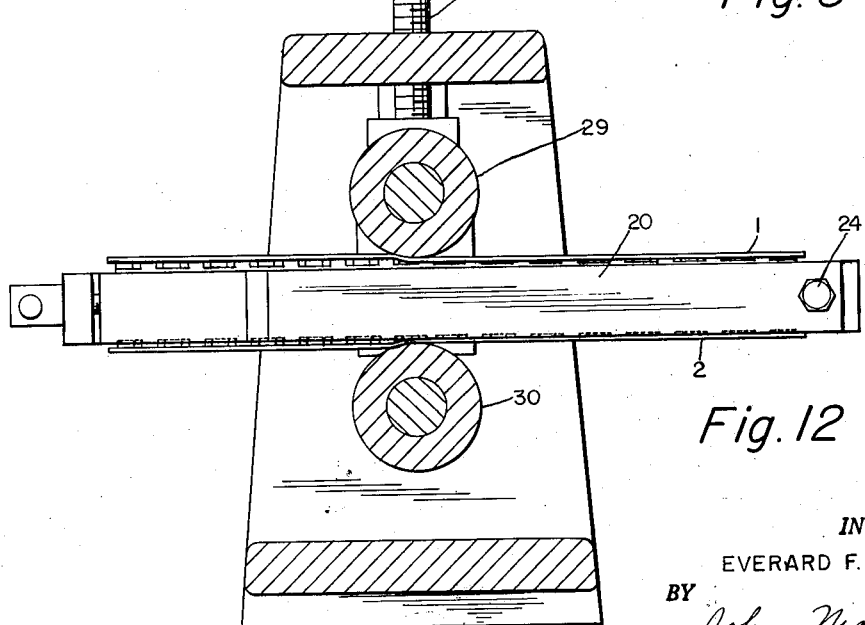
Fig. 12 is a cross sectional view of a press with parts in section and showing a side elevational view of a panel being passed between spaced rollers.

Pressure may be applied to the outer faces of the sheets by any suitable means, such as a press, or as shown in Fig. 12, the assembly including the outer sheets, the core strips, and the supports for the core strips which are held in place by the frame, may be passed between rollers 29 and 30 of a press 31. As shown, roller 29 of the press may be adjusted by means of a screw 32 to enable panels of various thickness to be passed between the rollers.

After the core strips have been mechanically connected to the outer sheets, screws 23, 25 and 27 may be released and the frame and the outermost supporting strips A and B may be removed. The straight metal strips 18 may then be withdrawn and because the remaining supports A and B each consists of vertically-extending strips pivotally connected together, they may also be easily withdrawn through the space between adjacent core strips. It will be noted that because the apices of the angularly-shaped portions of each core strip are arranged in alignment with the corresponding apices of each of the other core strips, the pivotally connected supports may be withdrawn even when the core strips are arranged in close relation to each other.

It will of course be understood that the drawings are merely illustrative and that panels may be provided that are of any desired width, length and height. In accordance with my invention, panels may also be provided consisting of outer sheets and having core strips arranged therebetween which are mechanically connected to the outer sheets and in which each of the sheets is provided with side flanges and one end flange which are in abutting engagement with the respective side flanges and one end flange of the other sheet in the completed panel as shown in Figs. 13 to 16 in which the front and rear sheets are designated by the numerals 33 and 34 and the core strips are designated by the numeral 35. As shown in the drawings, the front sheet has side flanges 36 which are in abutting engagement with the side flanges 37 on the rear sheet and is provided with a flange 38 at one end which is in abutting engagement with an end flange 39 on the other sheet. In the panel shown in Figs. 13 to 16, the opposite end portion of the panel is provided with a closure 42 which may be welded or otherwise secured to the sheets and their respective flanges.

In the panel disclosed in Figs. 13 to 16, it will of course be apparent that the core strips are provided with projections 4 on its side margins which are alternately tapered in opposite directions and portions of which are angularly embedded in the respective sheet in the manner disclosed in Fig. 6. The core strips are also preferably zigzag in shape and each is composed of angularly-shaped portions to provide comparatively strong braces or supports for the front and rear sheets, and to enable the core strips to be arranged in close relation to each other, the apices of the angularly-shaped portions of each core strip are arranged in alignment with the apices of the angularly-shaped portions of each of the other core strips. The core strips may be formed of the same metal as the front and rear sheets in which case the projections in the marginal portions of the core strips may be hardened by working in the manner previously described or the core strips may be formed of a metal that is harder than and which preferably has less thermal conductivity than the front and rear sheets. To further decrease the thermal conductivity between the front and rear sheets, the core strips are preferably of considerably less thickness than the front and rear sheets.

Figure 13:
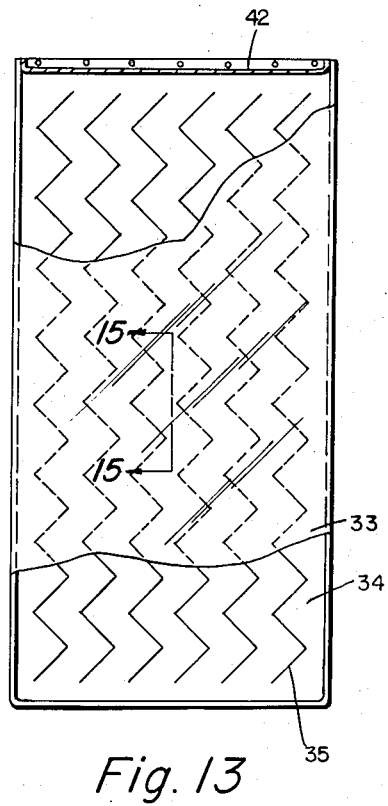
Fig. 13 is a side elevational view of a panel having a closure for one end thereof which is shown in section and having side walls mechanically connected to angularly-shaped metal core strips, one of the side walls of the panel being shown partly in elevation and partly broken away to show the spaced core strips.
Figure 14:
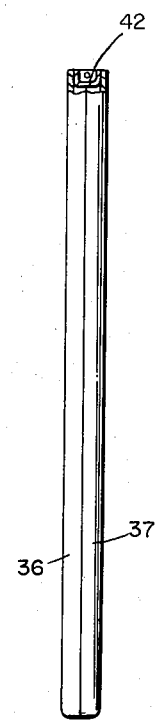
Fig. 14 is an end elevational view of the panel shown in Fig. 13 with parts broken away to show a closure for the panel.
Figure 16:
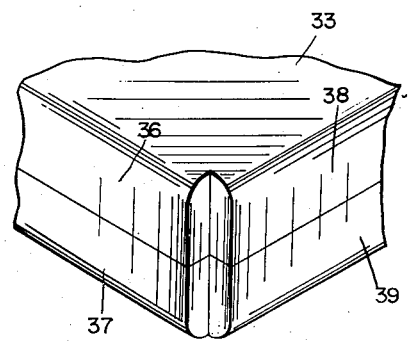
Fig. 16 is a perspective view of a corner of the panel.
Figure 15:
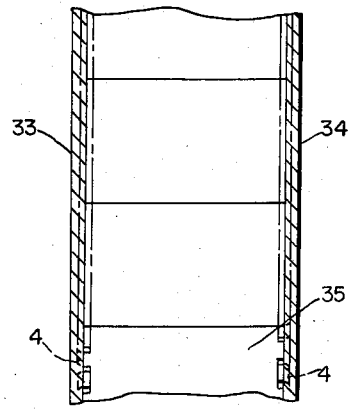
Fig. 15 is an enlarged cross sectional view taken on a plane passing through the line 15—15 of Fig. 13, looking in the direction of the arrows.

I have also provided an improved process of preparing a panel having three closed edges in which the core strips are comparatively thin in cross section and in which easily removable means are provided for supporting them during the pressing and rolling operation. This form of my invention is illustrated more particularly in Figs. 17 and 18 in which the sheet 33 may be considered the upper sheet and sheet 34 may be considered the lower sheet. Each of the sheets is provided with a rectangularly-shaped cut-out at the corners of one end which are arranged in opposed relation to the cut-outs of the other sheet and the side and one end margin of the lower sheet are bent upwardly to form side flanges 37 and an end flange 39 as shown more particularly in Fig. 16. The core strips are then assembled in place and while only two core strips are shown, it will of course be understood that the drawings are merely illustrative and that a multiplicity of core strips will be present as shown in Fig. 13, and while the core strips may be straight or sinuous in shape as illustrated in the drawings, they are zigzag in shape and consist of angularly-shaped portions in which the apices of the angularly-shaped portions on one core strip are arranged in alignment with the corresponding apices on the angularly-shaped portions on the other core strip to enable the strips to be arranged in close relation to each other.

Figure 17:
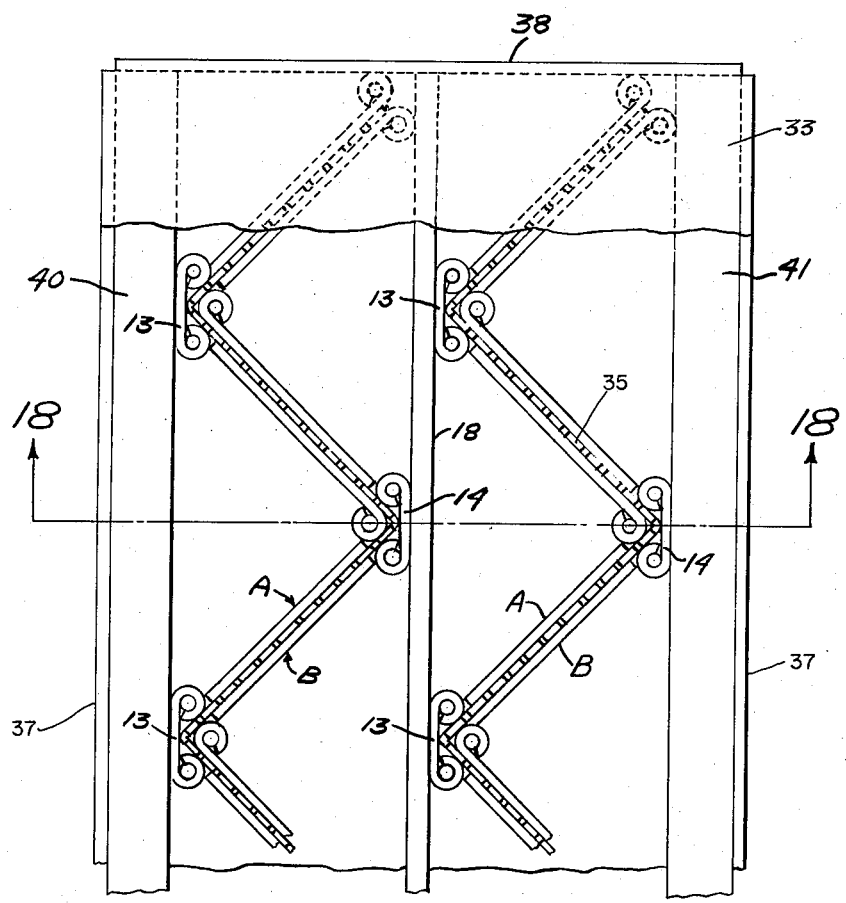
Fig. 17 is an enlarged schematic view showing the manner in which the core strips shown in Fig. 13 are supported in place during tthe pressing or rolling operation.
Figure 18:
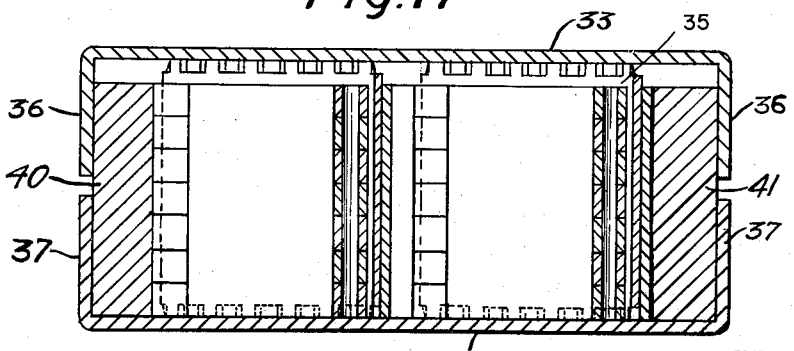
Fig. 18 is a cross sectional view taken on a plane passing through the line 18—18 of Fig. 16.

The core strips have spaced projections 4 in their upper and lower margins which are alternately tapered in opposite directions and are preferably thin enough in cross section so that they would collapse when sufficient pressure is applied to the outer faces of the sheets to force the projections in the upper and lower margins of the core strips into the metal of the respective sheets and to angularly embed them therein. In accordance with my invention, means are therefore provided to support the core strips in place during the rolling or pressing operation. For this purpose, supports are provided for engaging the opposite sides of each core strip. As shown in Fig. 17, supports A and B are provided and are arranged in the same manner as the strips shown in Figs. 8 and 9 and consequently the parts of the supports have been designated by the same reference numerals and to enable the supports to be easily removed after the core strips have been mechanically connected to the outer sheets, a metal strip 18 which may be slightly flexible is interposed between supports B and A for adjacent core strips throughout the length of the panel and an additional straight vertically extending metal strip 40 which may also be slightly flexible is arranged between one of the side flanges 37 of the lower sheet 34 and the longitudinally extending portions 13 of the outermost support A and in a like manner a metal strip 41 which may be slightly flexible is arranged between the other flange 37 of the lower sheet 34 and the horizontally extending portions 14 of the outermost support B as shown more particularly in Fig. 17. The side and end margins of the upper sheet are then bent downwardly to form side flanges 36 which extend over the vertically extending strips 40 and 41, respectively, and a downwardly extending end flange 38 which is arranged in opposed relation to the upwardly extending end flange 39 on the lower sheet when the upper sheet is assembled in place.

When the panel is thus assembled, the core strips maintain the side flanges of the upper sheet in spaced relation to the side flanges of the lower sheet and the end flange 38 of the upper sheet in spaced relation to the end flange 39 of the lower sheet. At this time, the supports A and B and the straight strips 18, 40 and 41, all of which are of less height than the core strips, rest upon the bottom sheet 34 and when pressure is applied to the opposite sides of sheets 33 and 34, such as by means of a press or by passing the panels between rollers as shown in Fig. 12, the tapered projections on the core strips are forced into the outer sheets as the outer sheets are moved toward each other and during this process, the supporting strips A, B, 18, 40 and 41 are moved upwardly but because they are of less height than the core strips, they never engage the upper sheet. During movement of the sheets toward each other, side flanges 36 and the end flange 38 of the upper sheet are also moved into abutting engagement with the side flanges 37 and the end flange of the lower sheet to provide a panel having three closed edges. It will of course be understood that at this time, the opposite end of the panel is open and consequently the straight supporting strips 18, 40 and 41 may be withdrawn outwardly through the open end of the panel, after which the pivotally connected supports A and B may also be withdrawn. To provide the finished panel, a closure 42 as shown in Fig. 13 may be applied to the open end and welds, not shown, may be applied to the cut-out portions at the corners of the opposite end of the panel.

What is claimed is:

1. The method of preparing panels which comprises interposing between upper and lower metal sheets a plurality of thin metal core strips, each of which has a body portion and a plurality of spaced projections in its upper and lower margins which are harder than the metal of which the sheets are composed and in which approximately half of the projections in the upper and lower margins of each core strip are tapered in one direction and the remaining projections are tapered in the opposite direction from the body portion and are arranged in alternate symmetrical relation with the projections tapered in the first-mentioned direction and each of said core strips being so thin in cross section that supporting means is required to prevent collapse of any portion of the core strips when sufficient pressure is applied to the opposite faces of the sheets to force a substantial portion of the tapered projections in the opposite margins of each core strip into the metal of the respective sheets, arranging on the opposite sides of each core strip supporting means for the core strips which are of sufficiently less height than the core strips to enable them to be removed after the pressing operation but which are of sufficient height to engage the opposite sides of each of the core strips over substantially the entire area of the core strip inwardly of the projections and which have sufficient strength to prevent collapse of any portion of the core strips under pressure necessary to force at least a portion of the projections in the upper and lower margin of each core strip into the respective sheets, applying sufficient pressure to the opposite faces of the sheets to move the sheets toward each other to force at least a portion of each of the projections in the upper margin of each core strip into the upper sheet and to angularly embed it within the metal of the upper sheet in a direction corresponding to the direction it is tapered to provide a strong mechanical connection between the core strips and the upper sheet and to force at least a portion of each projection in the lower margin of each core strip into the metal of the lower sheet and to angularly embed it within the metal of the lower sheet in a direction corresponding to the direction it is tapered to provide a strong mechanical connection between the core strips and the lower sheet, and then withdrawing the supporting means from between the sheets.

2. The method as defined in claim 1 in which the upper sheet is provided with downwardly extending side flanges and a downwardly extending end flange and the lower sheet is provided with upwardly extending side flanges and an upwardly extending end flange which are arranged in vertical alignment with the respective side and end flanges of the upper sheet and in which the core strips are of sufficient height to maintain the side and end flanges of the upper sheet in such spaced relation to the side and end flanges of the lower sheet so that when sufficient pressure is applied to the opposite faces of the sheets to move the sheets toward each other to force at least a portion of each of the projections in the upper margin of each core strip into the upper sheet and to angularly embed it therein and at least a portion of each of the projections in the lower margin of each of the core strips into the metal of the lower sheet and to angularly embed it therein, the side and end flanges of the upper sheet and the respective side flanges and the end flange of the lower sheet will be moved substantially into abutting engagement with each other and in which the supporting means for the core strips are withdrawn from between the sheets through the open end of the panel.

3. The method as defined in claim 1 in which each of the core strips is shaped to provide a plurality of focal portions on each side of the core strip and side wall portions diverging from each focal portion and in which the focal portions on each side of the core strips are in alignment with each other and are parallel to the focal portions on the oposite side of the core strip, arranging the focal portions and diverging side wall portions of each core strip in alignment with the corresponding focal portions and the diverging side wall portions of the other core strips and spacing the core strips in such relation to each other that the perpendicular distance between lines drawn tangent to the focal portions on the opposing sides of each pair of proximate core strips is sufficient to permit the withdrawal of supporting means arranged between the core strips but is less than the perpendicular distance between lines drawn tangent to focal portions on the opposite sides of each core strip and in which the supporting means for the core strips consist of pivotally connected metal strips, inserting straight metal strips between the aligned flanges on each side of the sheets and the adjacent pivotally connected support and a straight metal strip between each pair of pivotally connected supports for the opposing sides of each pair of proximate core strips to maintain the supporting means in engagement with the core strips during the pressing operation, and which also includes the steps of withdrawing the straight metal strips through the open end of the panel after the core strips have been mechanically connected to the sheets by the pressing operation.

4. The method as defined in claim 1 in which each of the core strips is shaped to provide a plurality of aligned apices on each side of the core strip and side wall portions diverging from each apex, and in which the apices on each side of the core strip are in alignment with each other and are parallel to the apices on the opposite side of the core strip, arranging the core strips so that the apices and diverging side wall portions of each core strip is in alignment with the corresponding apices and diverging side wall portions of each of the other core strips and in such spaced relation to each other that the perpendicular distance between parallel lines drawn tangent to the apices on the opposing sides of each pair of proximate core strips is sufficient to permit the withdrawal of supporting means for the core strips between the core strips but is less than the perpendicular distance between parallel lines drawn tangent to the apices on opposite sides of each core strip, and in which the supporting means for the core strips consists of pivotally connected strips, some of which engage the side wall portions of each core strip and others of which extend horizontally and engage the apex of each angularly-shaped portion of the core strip, inserting straight metal strips between the aligned flanges on each side of the sheets and the horizontally extending portions of adjacent pivotally connected supports and a straight metal strip between the longitudinally extending strips of each pair of proximate core strips to maintain the supporting means in firm engagement with the core strips during the pressing operation and which also includes the steps of withdrawing the straight metal maintaining strips through the open end of the panel after the core strips have been mechanically connected to the sheets by the pressing operation.

5. The method of preparing panels which comprises interposing between upper and lower metal sheets a plurality of metal core strips, each having a body portion which extends normal to the sheets and a plurality of spaced projections in its upper and lower margins which are harder than the metal of which the sheets are composed and in which approximately half of the projections in the upper and lower margins of each of the core strips are tapered in one direction and the remaining projections are tapered in the opposite direction from the body portion and are arranged in alternate symmetrical relation with the projections tapered in the first-mentioned direction and each of said core strips being so thin in cross section that supporting means is required for the core strips to prevent them from collapsing when sufficient pressure is applied to the opposite faces of the sheets to force a substantial portion of the tapered projections in the opposite margins of each core strip into the metal of the respective sheets, arranging on the opposite sides of each core strip supports of sufficiently less height than the core strips to enable them to be removed after the pressing operation but which are of sufficient height to engage the opposite sides of each of the core strips inwardly of its projections and which have sufficient strength to prevent collapse of any portion of the core strips during the pressing operation, maintaining the supports in engagement with the core strips, applying pressure to the opposite faces of the sheets to move said sheets toward each other to force at least a portion of each of the projections in the upper margin of each core strip into the upper sheet and to angularly embed it within the metal of the upper sheet in a direction corresponding to the direction it is tapered to provide a strong mechanical connection between the core strips and the upper sheet and to force at least a portion of each of the projections in the lower margin of each core strip into the metal of the lower sheet and to angularly embed it within the metal of the lower sheet in a direction corresponding to the direction it is tapered to provide a strong mechanical connection between the core strips and the lower sheet, releasing said maintaining means, and then withdrawing the supports from between the sheets.

6. The method of preparing panels which comprises interposing between upper and lower metal sheets a plurality of spaced metal core strips, each having a body portion which extends substantially normal to the sheets and in which the upper and lower margins of each of said core strips has projections separated by narrow slots of substantially less width than the projections, said projections being harder than the metal of which the sheets are composed and each of said projections having a face which extends normal to said sheets and in which alternate projections in each margin of each core strip are each tapered in one direction toward its normally extending face and the other alternate projections are each tapered in the opposite direction toward its normally extending face to provide penetrating edge portions, each of which is of less thickness but is of the same width as the remainder of the projection, and each of said core strips being so thin in cross section that supporting means is required for the core strips to prevent collapse of any portion of the core strips under pressure necessary to force at least a portion of the projections in the upper and lower margins of each core strip into the metal of the respective sheets, arranging on the opposite sides of each core strip supports of sufficiently less height than the core strips to enable them to be removed after the pressing operation but which are of sufficient height to engage the opposite sides of each of the core strips over substantially the entire area of the core strip inwardly of its projections and which have sufficient strength to prevent the collapse of any portion of the core strips during the pressing operation, maintaining the supports in engagement with the core strips, applying sufficient pressure to the opposite faces of the sheets to move said sheets toward each other to force at least a portion of each of the projections in the upper margin of each core strip into the upper sheet and to angularly embed it within the metal of the upper sheet in a direction corresponding to the direction it is tapered to provide a strong mechanical connection between the core strips and the upper sheet and to force at least a portion of each of the projections in the lower margin of each core strip into the metal of the lower sheet and to angularly embed it within the metal of the lower sheet in a direction corresponding to the direction it is tapered to provide a strong mechanical connection between the core strips and the lower sheet, releasing said maintaining means, and then removing the supports from between the sheets.

7. The method as defined in claim 6 in which each of the tapered projections in the upper and lower margins of each core strip is of sufficient height so that during the pressing operation only a portion of each tapered projection in the upper margin of each core strip is angularly embedded within the metal of the upper sheet and only a portion of each tapered projection in the lower margin of each of the core strips is angularly embedded within the metal of the lower sheet.

8. The method of preparing panels which comprises interposing between upper and lower metal sheets a plurality of spaced metal core strips, each having spaced tapered projections in its upper and lower margins which are harder than the metal of which the sheets are composed and each of which has a face which extends normal to the sheets and in which each of the alternate projections in each margin of each core strip has a face which is tapered in one direction toward its normally extending face and each of the other alternate projections in each margin is tapered in the opposite direction toward its normally extending face, each of said core strips being so thin in cross section that supporting means is required to prevent the core strips from collapsing when sufficient pressure is applied to the opposite faces of the sheets to force at least a portion of the tapered projections into the metal of the respective sheets and each of said core strips being shaped to provide a plurality of aligned apices on the opposite side of the core strip and side wall portions diverging from each apex, arranging the core strips so that the apices and diverging side wall portions of each core strip are in alignment with the corresponding apices and diverging side wall portions of each of the other core strips and in such spaced relation to each other that the perpendicular distance between lines drawn tangent to the apices of each proximate pair of opposing core strips is sufficient to permit the removal of supporting means between the core strips but is less than the perpendicular distance between lines drawn tangent to the apices on the opposite sides of each core strip, arranging on the opposite sides of each core strip supports of sufficiently less height than the core strips to enable them to be removed after the pressing operation but which are of sufficient height to engage the opposite sides of each of the core strips over substantially the entire area of the core strip inwardly of its projections and which have sufficient strength to prevent the collapse of any portion of the core strips during the pressing operation, and each of said supports being composed of metal strips pivotally connected together in which some of the strips of each support engage the apices of a core strip and extend in a horizontal direction and others of which engage the side walls of the core strip, interposing removable straight metal strips between supports for proximate core strips, maintaining the supports in firm engagement with the core strips, and simultaneously applying pressure to the opposite faces of said sheets to move the sheets toward each other a sufficient distance to force at least a portion of each of the tapered projections in the upper margin of each of the core strips into the metal of the upper sheet and to angularly embed it therein in a direction corresponding to the direction its face is tapered and at least a portion of each of the tapered projections in the lower margin of each of the core strips into the metal of the lower sheet and to angularly embed it therein in a direction corresponding to the direction its face is tapered, releasing said maintaining means, withdrawing the straight metal strips and then withdrawing the pivotally connected supports from between the sheets.

References Cited in the file of this patent

UNITED STATES PATENTS

| | | |
|---|---|---|
| 2,056,563 | Budd et al. | Oct. 6, 1936 |
| 2,327,265 | Herr | Aug. 17, 1943 |
| 2,333,600 | Trautvetter | Nov. 2, 1943 |
| 2,486,769 | Watson | Nov. 1, 1949 |
| 2,756,496 | Holland | July 31, 1956 |
| 2,878,560 | Gier | Mar. 24, 1959 |

FOREIGN PATENTS

| | | |
|---|---|---|
| 490,541 | Canada | Feb. 17, 1953 |